United States Patent
Sakuma et al.

(10) Patent No.: US 11,797,420 B2
(45) Date of Patent: Oct. 24, 2023

(54) DEBUG SUPPORT PROGRAM STORAGE MEDIUM, DEBUG SUPPORT APPARATUS, AND DEBUG SUPPORT METHOD

(71) Applicant: Mitsubishi Electric Corporation, Tokyo (JP)

(72) Inventors: Yuya Sakuma, Tokyo (JP); Daiki Nakahara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/916,798

(22) PCT Filed: Apr. 14, 2020

(86) PCT No.: PCT/JP2020/016449
§ 371 (c)(1),
(2) Date: Oct. 4, 2022

(87) PCT Pub. No.: WO2021/210071
PCT Pub. Date: Oct. 21, 2021

(65) Prior Publication Data
US 2023/0128016 A1    Apr. 27, 2023

(51) Int. Cl.
*G06F 11/36* (2006.01)

(52) U.S. Cl.
CPC ................ *G06F 11/3616* (2013.01)

(58) Field of Classification Search
CPC .................................. G06F 11/3616
See application file for complete search history.

(56) References Cited

U.S. PATENT DOCUMENTS

| 10,776,248 | B2 * | 9/2020 | Liu ..................... G06F 11/3616 |
| 2013/0111438 | A1 * | 5/2013 | Yoshimura .......... G06F 11/3604 |
| | | | 717/120 |
| 2018/0348728 | A1 | 12/2018 | Ota et al. |
| 2021/0250230 | A1 * | 8/2021 | Johnson ................. H01Q 3/005 |

(Continued)

FOREIGN PATENT DOCUMENTS

| JP | 2018-206362 A | 12/2018 |
| WO | 2010/095289 A1 | 8/2010 |
| WO | 2016/194099 A1 | 12/2016 |

OTHER PUBLICATIONS

International Search Report and Written Opinion dated Jul. 14, 2020, received for PCT Application PCT/JP2020/016449, filed on Apr. 14, 2020, 9 pages including English Translation.

(Continued)

*Primary Examiner* — S. Sough
*Assistant Examiner* — Zheng Wei
(74) *Attorney, Agent, or Firm* — XSENSUS LLP

(57) ABSTRACT

A debug support program causes a computer to execute a step of extracting a set of variables having a dependency relation from a plurality of variables written in a plurality of process blocks that are included in a sequence program and each describe a process per device, that is to say, a process per slave device; a step of collecting log information recording information regarding input of a value to each of the plurality of variables written in the process blocks; a step of correcting an extraction result regarding the dependency relation on the basis of contents of the collected log information; and a step of presenting a corrected extraction result.

10 Claims, 12 Drawing Sheets

(56) References Cited

U.S. PATENT DOCUMENTS

2021/0263496 A1\* 8/2021 Watanabe ............... G06F 11/36
2021/0397148 A1\* 12/2021 Ota ..................... G05B 19/042

OTHER PUBLICATIONS

Nakai, "Key Word Combinable Program Analysis Environment for Ladder Diagram", FIT2011 (10th IPSJ Forum) Proceedings, First Volume, 2011, pp. 57-62 (21 pages including English Translation).
Decision to Grant dated Jan. 5, 2021, received for JP Application 2020-552928, 5 pages including English Translation.

\* cited by examiner

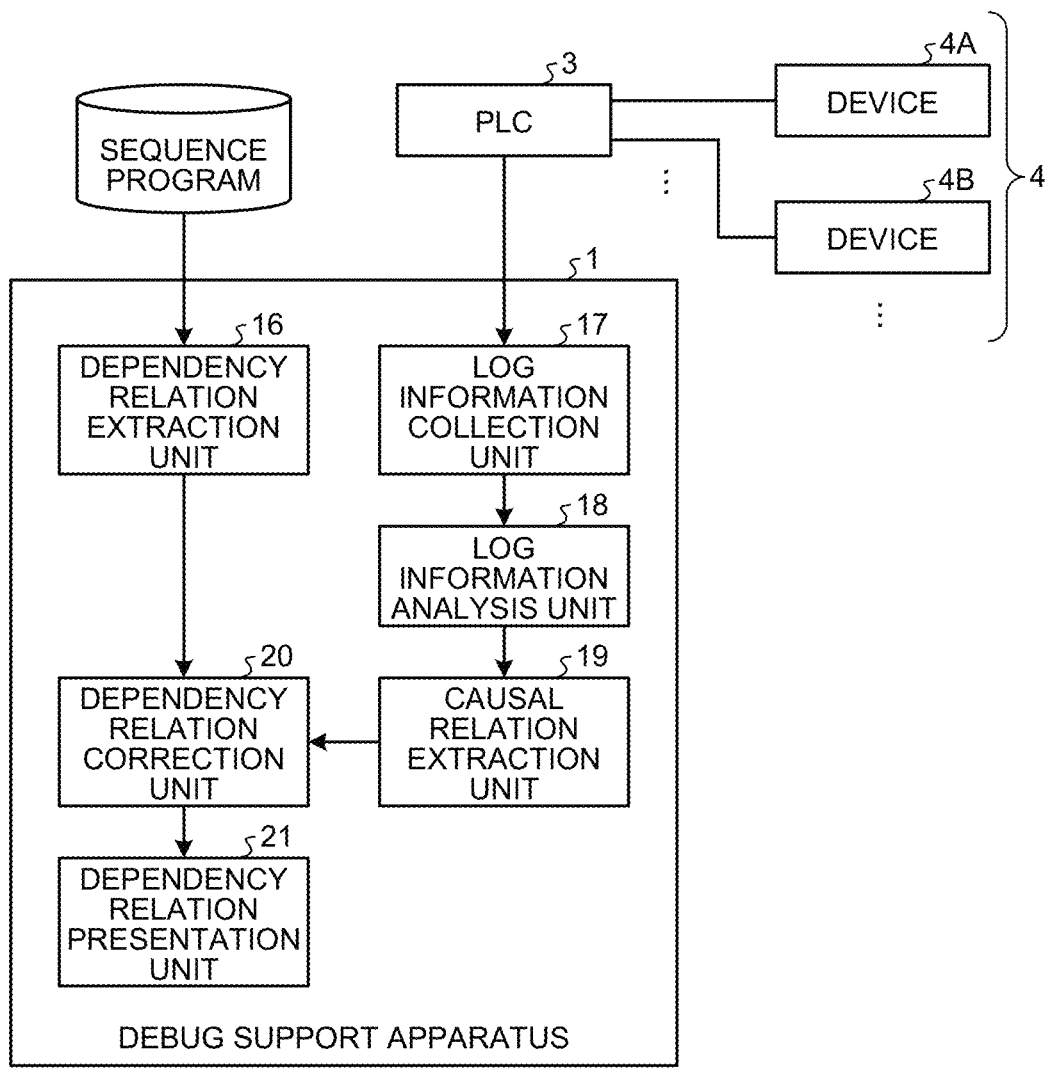
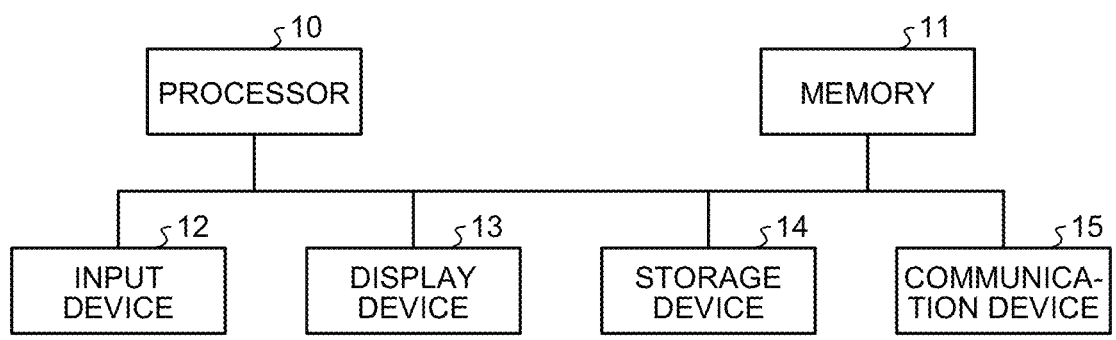

| PROCESS BLOCK NAME | INPUT DEVICE INFORMATION | | OUTPUT DEVICE INFORMATION | |
|---|---|---|---|---|
| | DATE AND TIME | TRIGGERED DEVICE | DATE AND TIME | TRIGGERED DEVICE |
| PROCESS BLOCK A | 20xx/xx/xx 00:00:00 | X1 | 20xx/xx/xx 00:00:30 | Y0 |
| PROCESS BLOCK B | 20xx/xx/xx 00:00:31 | X10 | 20xx/xx/xx 00:01:00 | Y10 |
| PROCESS BLOCK A | 20xx/xx/xx 00:02:00 | X1 | 20xx/xx/xx 00:02:30 | Y0 |
| PROCESS BLOCK B | 20xx/xx/xx 00:02:31 | X10 | 20xx/xx/xx 00:03:00 | Y10 |
| PROCESS BLOCK A | 20xx/xx/xx 00:04:00 | X1 | 20xx/xx/xx 00:04:30 | Y0 |
| PROCESS BLOCK B | 20xx/xx/xx 00:04:31 | X10 | 20xx/xx/xx 00:05:00 | Y10 |

FIG.14

| PROCESS BLOCK NAME | INPUT DEVICE INFORMATION | | OUTPUT DEVICE INFORMATION | |
|---|---|---|---|---|
| | DATE AND TIME | TRIGGERED DEVICE | DATE AND TIME | TRIGGERED DEVICE |
| PROCESS BLOCK A | 20xx/xx/xx 00:00:00 | X10 | 20xx/xx/xx 00:00:30 | Y0 |
| PROCESS BLOCK A | 20xx/xx/xx 00:00:31 | M0 | 20xx/xx/xx 00:01:00 | Y10 |
| PROCESS BLOCK B | 20xx/xx/xx 01:00:31 | X20 | 20xx/xx/xx 01:01:00 | Y20 |
| PROCESS BLOCK B | 20xx/xx/xx 01:01:01 | M0 | 20xx/xx/xx 01:01:30 | Y30 |
| PROCESS BLOCK A | 20xx/xx/xx 02:00:00 | X10 | 20xx/xx/xx 02:00:30 | Y0 |
| PROCESS BLOCK A | 20xx/xx/xx 02:00:31 | M0 | 20xx/xx/xx 02:01:00 | Y10 |
| PROCESS BLOCK B | 20xx/xx/xx 03:00:31 | X20 | 20xx/xx/xx 03:01:00 | Y20 |
| PROCESS BLOCK B | 20xx/xx/xx 03:01:01 | M0 | 20xx/xx/xx 03:01:30 | Y30 |

DEBUG SUPPORT PROGRAM STORAGE MEDIUM, DEBUG SUPPORT APPARATUS, AND DEBUG SUPPORT METHOD

CROSS-REFERENCE TO RELATED APPLICATION

The present application is based on PCT filing PCT/JP2020/016449, filed Apr. 14, 2020, the entire contents of which is incorporated herein by reference.

FIELD

The present disclosure relates to a debug support program storage medium, a debug support apparatus, and a debug support method for assisting in debugging a sequence program.

BACKGROUND

Control devices such as a programmable logic controller (PLC) have been used to control production equipment in factories or the like. The control device executes a sequence program to control slave devices. Debugging involving operation verification of the sequence program includes checking states of the slave devices or checking values of variables that change as the sequence program is executed.

The program analysis support device disclosed in Patent Literature 1 extracts a directed graph showing dependency relations among variables written in a program and displays the directed graph extracted. Two variables have a dependency relation when a value of one of the two variables determines a value of the other variable. Since the program analysis support device described in Patent Literature 1 extracts a directed graph for a variable specified by a user of a control device, efficiency of program analysis work improves.

CITATION LIST

Patent Literature

Patent Literature 1: PCT International Publication No. 2010/95289

SUMMARY

Technical Problem

The production equipment often includes a plurality of devices. The slave devices of the production equipment are each controlled by the control device executing the sequence program such that they operate in accordance with a production process. In a description below, a sequence program describing a process per slave device in the sequence program to be executed by the control device may be referred to as a "process block". The control device that controls a plurality of slave devices executes the sequence program including per-slave-device process blocks.

Suppose that the production process includes a process in which one of the plurality of slave devices, namely, a device A operates and this causes another of the plurality of slave devices, namely, a device B to operate. In this case, even if a problem occurs in the operation of the device B, the process block for the device A, not the process block for the device B, could have a bug. With the above conventional technique described in Patent Literature 1, dependency relations among variables written in the process blocks are extracted, so that the process block for the device B with the problem is analyzed before the process block for the device A that affects the operation of the device B is analyzed. The conventional technique requires that extraction of a relation between variables written respectively in the different process blocks be performed manually; therefore, there is a problem in that the efficiency of debugging work is reduced.

The present disclosure has been made in view of the above, and an object of the present disclosure is to obtain a debug support program that enables improved efficiency of debugging work.

Solution to Problem

To solve the aforementioned problems and achieve the object, a debug support program according to the present disclosure causes a computer to function as a debug support apparatus that assists in debugging a sequence program to be executed by a control device. The debug support program according to the present disclosure causes the computer to execute: a step of extracting a set of variables having a dependency relation from a plurality of variables written in a plurality of process blocks included in the sequence program, each of the plurality of process blocks describing a process per slave device; a step of collecting log information recording information regarding input of a value to each of the plurality of variables written in the process blocks; a step of correcting an extraction result regarding the dependency relation on the basis of contents of the log information collected; and a step of presenting a corrected extraction result.

Advantageous Effect of Invention

The debug support program according to the present disclosure produces an effect of enabling improved efficiency of debugging work.

BRIEF DESCRIPTION OF DRAWINGS

FIG. 1 is a diagram illustrating a functional configuration of a debug support apparatus according to a first embodiment.

FIG. 2 is a diagram illustrating a hardware configuration for implementing functions of the debug support apparatus according to the first embodiment.

FIG. 14 is a diagram illustrating examples of log information that are detected by a log information analysis unit of the debug support apparatus according to the second embodiment.

DESCRIPTION OF EMBODIMENTS

Figure 3:
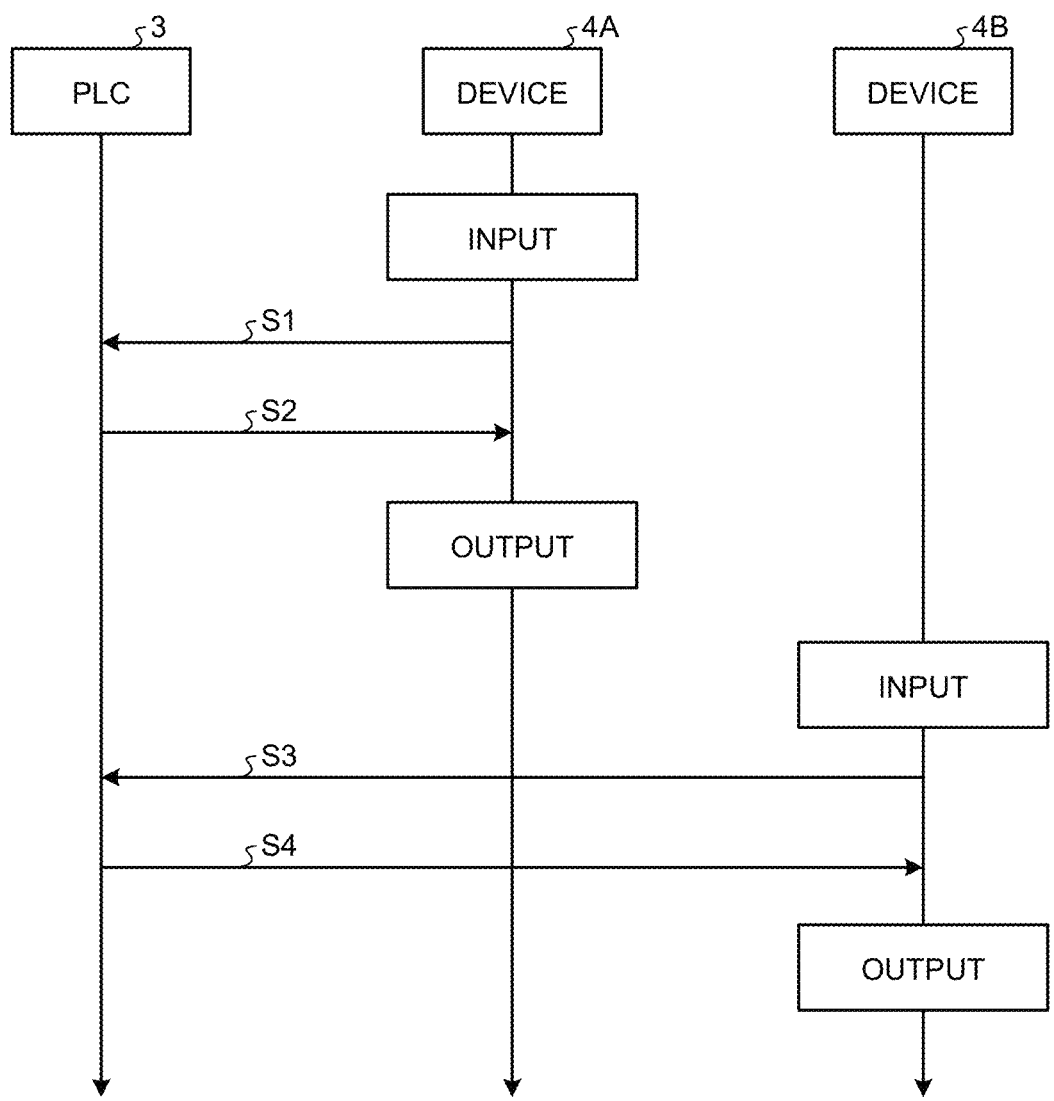
FIG. 3 is a first diagram illustrating a sequence program that undergoes debugging support by the debug support apparatus according to the first embodiment.

With reference to the drawings, a detailed description is hereinafter provided of a debug support program storage medium, debug support apparatuses, and debug support methods according to embodiments.

First Embodiment

FIG. 1 is a diagram illustrating a functional configuration of a debug support apparatus according to a first embodiment. A debug support apparatus 1 according to the first embodiment assists in debugging a sequence program that a PLC 3 serving as a control device executes. A plurality of devices 4 are connected to the PLC 3. The PLC 3 executes the sequence program to control the devices 4, which are slave devices. FIG. 1 illustrates two of the plurality of devices 4: a device 4A and a device 4B. The sequence program that the PLC 3 executes includes a plurality of process blocks. Each of the plurality of process blocks describes a process per slave device.

The debug support apparatus 1 is a computer system with a debug support program installed. The debug support program assists in debugging sequence programs. The computer system is a personal computer or a general-purpose computer. A hardware configuration of the computer system is used for implementing the functional configuration illustrated in FIG. 1.

The debug support apparatus 1 includes a dependency relation extraction unit 16 that extracts, from the sequence program, any set of variables having a dependency relation; a log information collection unit 17 that collects log information from the PLC 3; a log information analysis unit 18 that analyzes the collected log information; a causal relation extraction unit 19 that extracts, from the log information, any set of variables having a causal relation; a dependency relation correction unit 20 that is a correction unit that corrects an extraction result regarding the dependency relation; and a dependency relation presentation unit 21 that is a presentation unit that presents a corrected extraction result. A detailed description of each of these functional units is provided later.

FIG. 2 is a diagram illustrating the hardware configuration for implementing functions of the debug support apparatus according to the first embodiment. The computer system that functions as the debug support apparatus 1 includes a processor 10 that executes various processes, a memory 11 serving as an internal memory, an input device 12 that is used to enter inputs into the debug support apparatus 1, a display device 13 that displays information, a storage device 14 that retains various information, and a communication device 15 that communicates with a device external to the debug support apparatus 1.

The processor 10 is a central processing unit (CPU). The processor 10 may be a processing unit, an arithmetic unit, a microprocessor, a microcomputer, or a digital signal processor (DSP). The memory 11 is a random-access memory (RAM), a read-only memory (ROM), a flash memory, an erasable programmable read-only memory (EPROM), or an electrically erasable programmable read-only memory (EEPROM) (registered trademark). The storage device 14 is a hard disk drive (HDD) or a solid-state drive (SSD). The debug support program is stored in the storage device 14. The processor 10 reads the debug support program stored in the storage device 14 into the memory 11 and executes the debug support program.

The input device 12 is a device such as a keyboard, a mouse, or a touch panel. The communication device 15 is a connection interface to the device external to the debug support apparatus 1. The communication device 15 communicates with the PLC 3. The display device 13 displays information on a screen.

The debug support program may be stored in a storage medium readable by the computer system. The debug support apparatus 1 may store, in the memory 11, the debug support program recorded in the storage medium. The storage medium may be a portable storage medium that is a flexible disk or a flash memory that is a semiconductor memory. The debug support program may be installed on the computer system from another computer or a server device via a communication network.

The dependency relation extraction unit 16, the log information collection unit 17, the log information analysis unit 18, the causal relation extraction unit 19, and the dependency relation correction unit 20 are implemented with a combination of the processor 10 and software. The dependency relation extraction unit 16, the log information collection unit 17, the log information analysis unit 18, the causal relation extraction unit 19, and the dependency relation correction unit 20 may be implemented with a combination of the processor 10 and firmware or with a combination of the processor 10, software, and firmware. The software or the firmware is described as programs and is stored in the storage device 14. The function of the dependency relation presentation unit 21 is implemented using the display device 13.

FIG. 3 is a first diagram illustrating the sequence program that undergoes debugging support by the debug support apparatus according to the first embodiment. FIG. 3 is a sequence diagram illustrating an example of sequence control that includes the process block that describes the process for the device 4A and the process block that describes the process for the device 4B.

At step S1, the device 4A transmits to the PLC 3 a signal that turns on an input relay for a terminal assigned for input to a constituent element of the device 4A. While the input relay is on, the PLC 3 causes an output relay for a terminal assigned for output of the constituent element of the device 4A to be on. At step S2, the PLC 3 transmits a signal for output control to the device 4A.

Suppose that the device 4B performs an input, following an output of the device 4A. The input of the device 4B is not performed in response to a signal from the device 4A but arises from the operation of the device 4A. One given example is a case where the device 4B operates on power from the operation of the device 4A. At step S3, the device 4B transmits to the PLC 3 a signal that turns on an input relay for a terminal assigned for input to a constituent element of the device 4B. While the input relay is on, the PLC 3 causes an output relay for a terminal assigned for output of the constituent element of the device 4B to be on. At step S4, the PLC 3 transmits a signal for output control to the device 4B.

Figure 4:
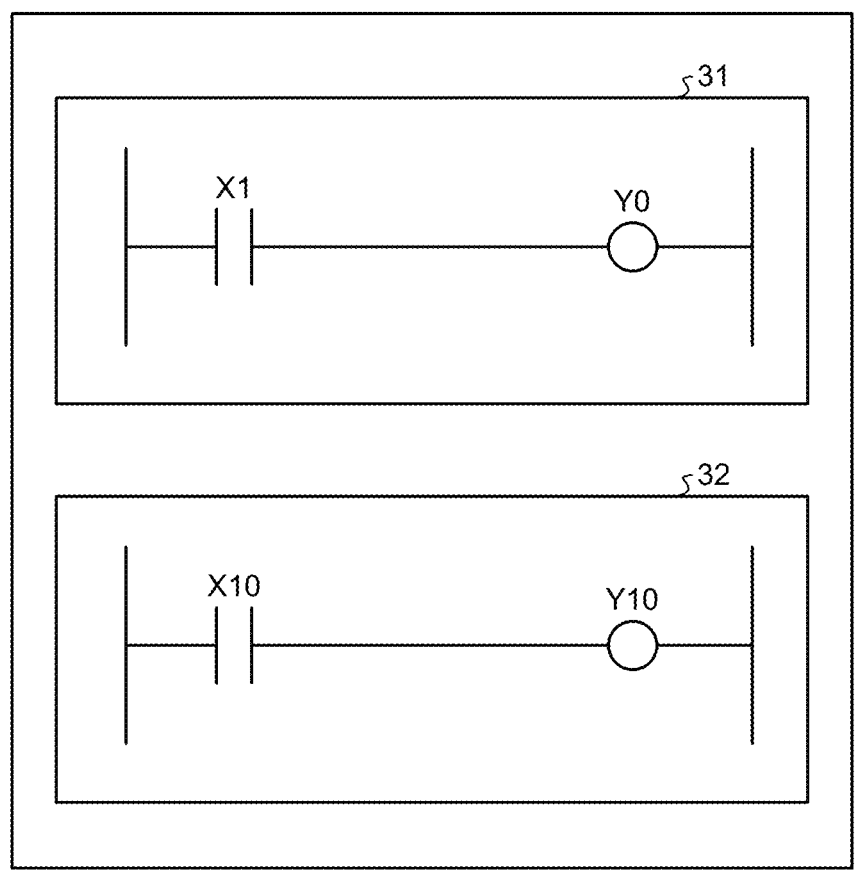
FIG. 4 is a second diagram illustrating the sequence program that undergoes the debugging support by the debug support apparatus according to the first embodiment.

FIG. 4 is a second diagram illustrating the sequence program that undergoes the debugging support by the debug support apparatus according to the first embodiment. In the first embodiment, the sequence program is a ladder program written with a ladder language. FIG. 4 illustrates an example in which the sequence diagram in FIG. 3 is replaced with the ladder program. The sequence program may be a program written with a language other than the ladder language, such as a program written with a structured ladder language or a program written with a function block diagram language.

The ladder program includes a plurality of circuit blocks. Each of the circuit blocks is a combination of a condition part and an action part. The condition part is a circuit of a group of contacts connected in series or in parallel. The action part is a circuit of a group of one or more coils connected in series. The action part represents contents of computational processing that is performed when the contact in the condition part conducts.

A program code that is created with the ladder language includes a basic circuit element, that is to say, a circuit symbol and a variable. Circuit symbols include contacts and coils that each indicate processing in the PLC 3. Variables are control targets on the sequence program and represent targets of the processings that are indicated respectively by the circuit symbols. Each of the variables is written as a combination of an alphabet representing a type of circuit element and a number identifying the element. The variables are associated respectively with a plurality of data areas of the PLC 3. The memory areas store computation data on a per-circuit-element basis. The computation data include bit data expressly distinguishing between on and off and word data expressing numerical values. A user can assign any number to be included in the variable on a per-processing-target basis. The variable that is used in programming the ladder program or the data area that is associated with the variable is referred to as a "device".

In FIG. 4, a circuit block 31 refers to a circuit block constituting the process block for the device 4A. A circuit block 32 refers to a circuit block constituting the process block for the device 4B. The circuit block 31 includes a device X1 serving as an input device and a device Y0 serving as an output device. The circuit block 32 includes a device X10 serving as an input device and a device Y10 serving as an output device. The input device is the variable or the data area that has been assigned for input to the device 4. The output device is the variable or the data area that has been assigned for output of the device 4.

In the circuit block 31, as a value of the device X1 changes as a result of an on-off switching of the input to the device 4A, a value of the device Y0 changes, resulting in an on-off switching of the output of the device 4A. Since the value of the device Y0 is determined by the value of the device X1, the device X1 and the device Y0 have a dependency relation.

In the circuit block 32, as a value of the device X10 changes as a result of an on-off switching of the input to the device 4B, a value of the device Y10 changes, resulting in an on-off switching of the output of the device 4B. As with the circuit block 31, in the circuit block 32, the device X10 and the device Y10 have a dependency relation.

Figure 5:
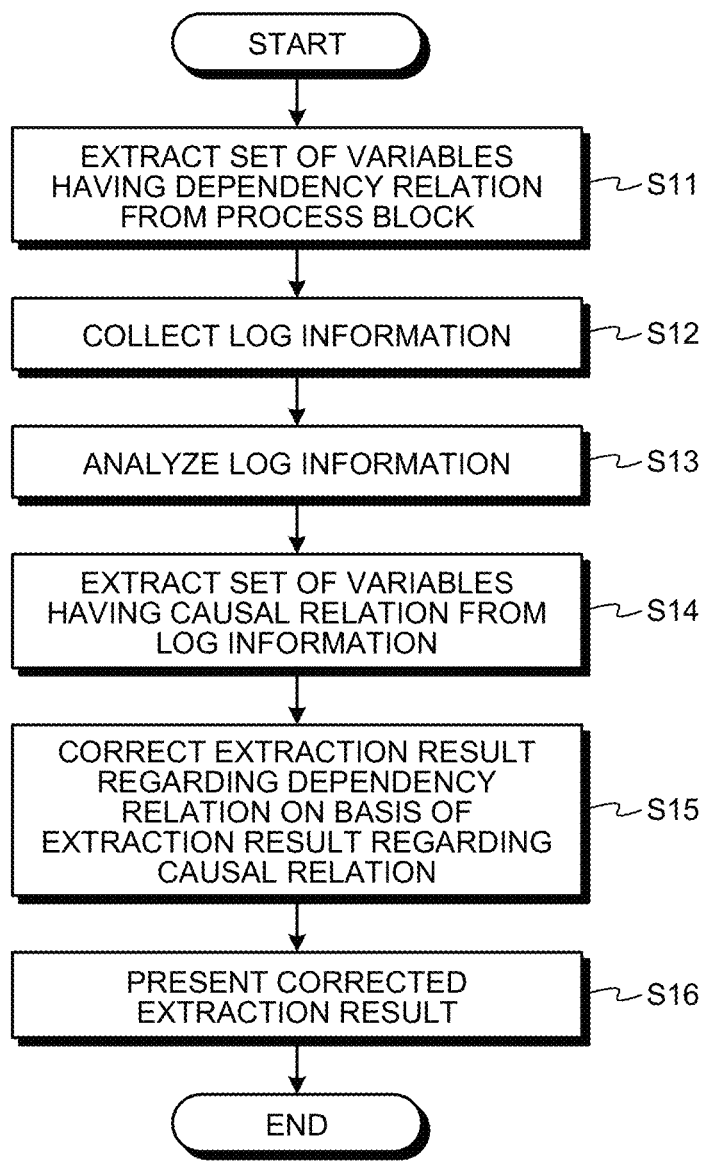
FIG. 5 is a flowchart illustrating an operational procedure of the debug support apparatus according to the first embodiment.

A description is provided next of how the debug support apparatus 1 operates. FIG. 5 is a flowchart illustrating an operational procedure of the debug support apparatus according to the first embodiment. At step S11, the dependency relation extraction unit 16 extracts any set of variables having a dependency relation from any process block. The dependency relation extraction unit 16 performs the extraction from each of process blocks that are included in a sequence program. The dependency relation indicates such a relation that a value of one of at least two variables determines a value of another of the at least two variables. For example, the dependency relation extraction unit 16 extracts a set of devices that are connected by a connection line in a ladder program as a set of devices having a dependency relation. Any method is used for determining whether or not the dependency relation exists. The dependency relation extraction unit 16 may perform the extraction of a set of variables using a user-specified variable as a starting point.

At step S12, the log information collection unit 17 collects log information recording information regarding input of values to respective multiple variables written in the process blocks. The log information collection unit 17 obtains an execution log retained in the PLC 3 from the PLC 3. The execution log includes information indicating the variables and data on dates and times at which values are input to the variables. The log information that is collected by the log information collection unit 17 includes at least the information that indicates the variables, the data on the dates and times, and process block names. The process block name is a name given to each process block in the sequence program. Any other information included in the execution log does not have to be included in the log information.

One given method of collecting log information is to collect, for devices predetermined as collection targets, event times and values input to the devices in association with each other, on the basis of the events in which a process involving inputs to these devices is performed. The log information collection unit 17 may collect log information in which event times and values input to the devices are associated with each other for all the devices under the management of the PLC 3. The log information collection unit 17 may collect log information in which event times and values input to the devices are associated with each other for devices used in the sequence program. In a description below, the log information collection unit 17 collects event times and values input to the devices in association with each other on the basis of the events in which the devices predetermined as collection targets are processed.

At step S13, the log information analysis unit 18 analyzes the log information collected at step S12. In the log information analysis, the log information analysis unit 18 detects log information on the input device and log information on the output device from the log information. In the description, the log information on the input device may be referred to as input device information, and the log information on the output device may be referred to as output device information.

Figures 6, 7:
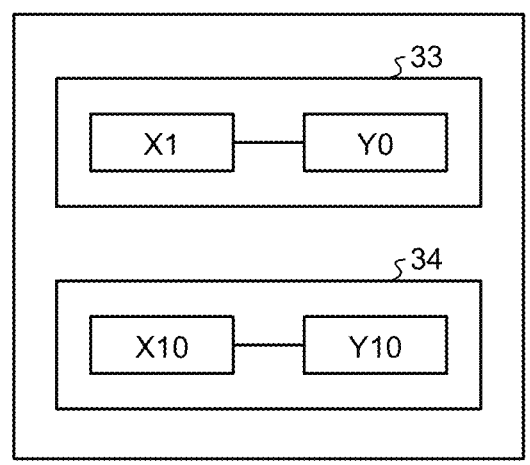
FIG. 6 is a diagram illustrating examples of log information that are detected by a log information analysis unit of the debug support apparatus according to the first embodiment.
FIG. 7 is a diagram illustrating examples of an extraction result from a dependency relation extraction unit of the debug support apparatus according to the first embodiment.

FIG. 6 is a diagram illustrating examples of the log information that are detected by the log information analysis unit of the debug support apparatus according to the first embodiment. "PROCESS BLOCK A" refers to a name of the process block for the device 4A. "PROCESS BLOCK B" refers to a name of the process block for the device 4B.

"TRIGGERED DEVICE" included in "INPUT DEVICE INFORMATION" in FIG. 6 refers to an input device to which a value has been input. "TRIGGERED DEVICE" included in "OUTPUT DEVICE INFORMATION" in FIG. 6 refers to an output device to which a value has been input. "DATE AND TIME" in FIG. 6 refers to a date and time at which a value is input to "TRIGGERED DEVICE". For example, input device information d1 that includes the date and time "20xx/xx/xx 00:00:00" and the triggered device "X1" in FIG. 6 indicates that a value is input to the device X1 at 00:00:00 on 20xx/xx/xx. FIG. 6 illustrates input device information on each of the devices X1 and X10 and output device information on each of the devices Y0 and Y10 in the log information detected.

At step S14, the causal relation extraction unit 19 extracts any set of variables having a causal relation from the log information. The causal relation indicates such a relation that output control resulting from input of a value to a variable that has been assigned for output among at least two variables written in different process blocks causes a value to be input to another of the at least two variables that has been assigned for input.

Suppose that the device 4A is a first slave device that is one of the plurality of slave devices, that "PROCESS BLOCK A" is a first process block describing the process for the first slave device, that the device 4B is a second slave device that is another of the plurality of slave devices, and that "PROCESS BLOCK B" is a second process block describing the process for the second slave device. A causal relation in this example is a relation in which the output control resulting from input of a value to the variable assigned for the output of the device 4A in the process block A causes a value to be input to the variable assigned for the input to the device 4B in the process block B. The causal relation extraction unit 19 determines whether or not there is any causal relation on the basis of the log information and extracts the set of variables that have the causal relation from the log information.

In the example illustrated in FIGS. 3 and 4, the output control of the device 4A resulting from input of the value to the device Y0 causes the value to be input to the device X10 that is assigned for the input to the device 4B. In this case, the device Y0 and the device X10 have the causal relation.

A description is provided here of how the causal relation extraction unit 19 extracts a set of variables having a causal relation. The extraction of the set of variables with the causal relation from the variables in the process block A and the variables in the process block B is described here as an example. The causal relation extraction unit 19 first reads the date and time included in the output device information regarding the process block A. The causal relation extraction unit 19 detects, from the input device information regarding the process block B, input device information indicating that input of a value to the input device has come after input of a value to the output device in the process block A.

In FIG. 6, for example, for the output device information d2 that includes the date and time "20xx/xx/xx 00:00:30" and the triggered device "Y0", the input device information d3 that includes "20xx/xx/xx 00:00:31" and the triggered device "X10" is the input device information that includes the data on the earliest date and time from "20xx/xx/xx 00:00:30" among every input device information regarding the process block B. For the output device information d2, the causal relation extraction unit 19 detects the input device information d3, which indicates that input of a value to the input device has come after input of a value to the output device of the process block A. For every output device information regarding the process block A, the causal relation extraction unit 19 detects the input device information regarding the process block B as in the case of the output device information d2.

The causal relation extraction unit 19 calculates a time difference, that is to say, a difference between the date and time included in the output device information regarding the process block A and the date and time included in the detected input device information regarding the process block B. The time difference between the output device information d2 and the input device information d3 is 1 second. The causal relation extraction unit 19 calculates the time difference between every output device information regarding the process block A and the corresponding input device information regarding the process block B.

The causal relation extraction unit 19 calculates an average time difference for each set of the output device that is the triggered device in the process block A and the input device that is the triggered device in the process block B. In FIG. 6, for the set of the device Y0 in the process block A and the device X10 in the process block B, the calculated average of the time difference between the output device information d2 and the input device information d3, the time difference between the output device information d4 and the input device information d5, and the time difference between the output device information d6 and the input device information d7 is "1 second".

The causal relation extraction unit 19 compares the calculated average with a preset threshold. If the calculated average for the set of the output device and the input device is smaller than the threshold, the causal relation extraction unit 19 determines that the set of the output device and the input device has the causal relation. If the threshold is, for example, "5 seconds", then the calculated average "1 second" for the set of the device Y0 in the process block A and the device X10 in the process block B is smaller than the threshold. In this case, the causal relation extraction unit 19 determines that the set of the device Y0 in the process block A and the device X10 in the process block B has the causal relation.

At step S15, the dependency relation correction unit 20 corrects an extraction result regarding the dependency relation on the basis of an extraction result regarding the causal relation. At step S16, the dependency relation presentation unit 21 presents a corrected extraction result.

Figure 8:
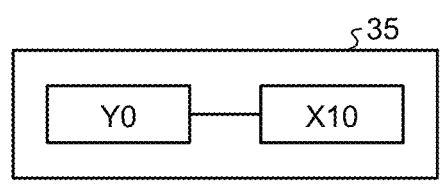
FIG. 8 is a diagram illustrating an example of an extraction result from a causal relation extraction unit of the debug support apparatus according to the first embodiment.
Figure 9:
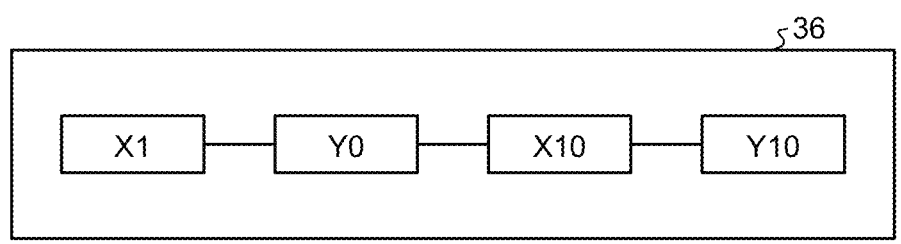
FIG. 9 is a diagram illustrating an example of a corrected extraction result from a dependency relation correction unit of the debug support apparatus according to the first embodiment.

A description is provided here of the correction that the dependency relation correction unit 20 performs on the extraction result regarding the dependency relation. FIG. 7 is a diagram illustrating examples of the extraction result from the dependency relation extraction unit of the debug support apparatus according to the first embodiment. FIG. 8 is a diagram illustrating an example of the extraction result from the causal relation extraction unit of the debug support apparatus according to the first embodiment. FIG. 9 is a diagram illustrating an example of the corrected extraction result from the dependency relation correction unit of the debug support apparatus according to the first embodiment.

One of the examples illustrated in FIG. 7 is an extraction result of the dependency relation between the variables in the process block A. The extraction result 33 shows the dependency relation between the device X1 and the device Y0 in FIG. 4. The extraction result 34 shows the dependency relation between the device X10 and the device Y10 in FIG. 4. The example illustrated in FIG. 8 is an extraction result of the causal relation between the variable in the process block A and the variable in the process block B. The extraction result 35 shows the causal relation between the device Y0 and the device X10 in FIG. 6.

The extraction result 36 illustrated in FIG. 9 is obtained by adding the causal relation shown in the extraction result 35 to the dependency relation shown in the extraction result 33 and the dependency relation shown in the extraction result 34. As described above, the dependency relation correction unit 20 corrects the extraction results 33 and 34 regarding the dependency relations by adding the extraction result 35 regarding the causal relation to the extraction results 33 and 34 regarding the dependency relations. The dependency relation presentation unit 21 presents the corrected extraction result 36 as illustrated in FIG. 9.

The causal relation extraction unit 19 may determine whether or not there is any causal relation on the basis of a standard deviation of the time differences as an alternative to the result of comparison between the average time difference and the threshold. In that case, the causal relation extraction unit 19 calculates the standard deviation of the time differences instead of the average time difference. The causal relation extraction unit 19 determines whether or not there is any causal relation from standard deviation-based variation of the time differences. The causal relation extraction unit 19 determines that a set of variables having a smaller variation in time difference than other sets of variables has a causal relation. The log information is not limited to including the data on the dates and times. The log information may be any log information provided that data that enables time difference calculation for each triggered variable is included. The log information may include count values from a counter. Calculation of the average or the standard deviation is not the only way to determine whether or not there is any causal relation. The causal relation extraction unit 19 uses any algorithm to determine whether or not there is any causal relation.

The debug support apparatus 1 according to the first embodiment extracts any set of variables having a dependency relation from a plurality of variables written in process blocks and extracts any set of variables having a causal relation written in the different process blocks. The causal relation extraction unit 19 extracts the set of variables having the causal relation from collected log information. The debug support apparatus 1 corrects an extraction result regarding the dependency relation on the basis of an extraction result regarding the causal relation and presents a corrected extraction result. Therefore, the user can obtain the extraction result that reflects the relation between the variables written in the different process blocks without having to manually extract the relation between the variables written in the different process blocks. Thus, the debug support apparatus 1 enables improved efficiency of debugging work.

Second Embodiment

Figure 10:
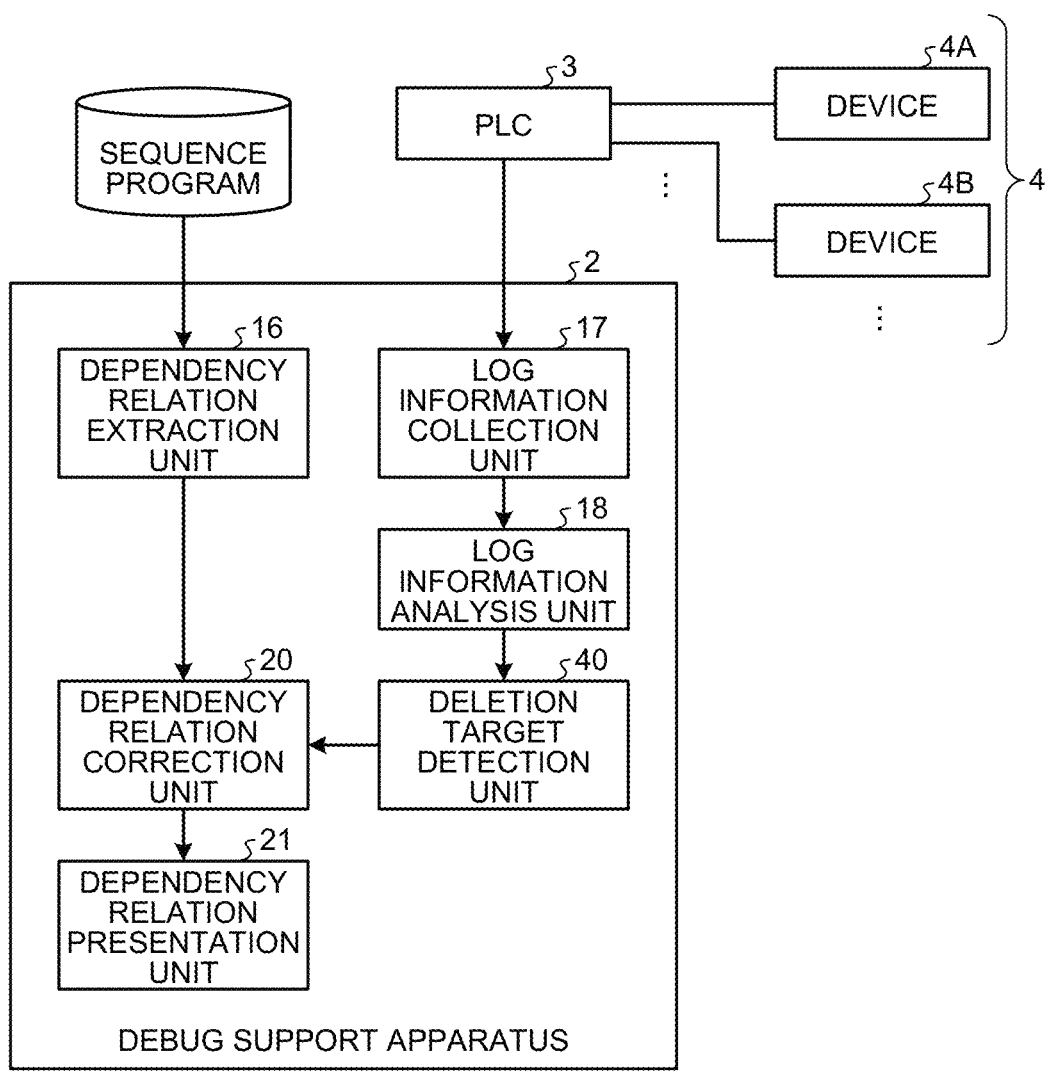
FIG. 10 is a diagram illustrating a functional configuration of a debug support apparatus according to a second embodiment.

FIG. 10 is a diagram illustrating a functional configuration of a debug support apparatus according to a second embodiment. A debug support apparatus 2 according to the second embodiment includes a deletion target detection unit 40 in place of the causal relation extraction unit 19 according to the first embodiment. In the second embodiment, constituent elements identical with those in the above-described first embodiment have the same reference characters, and a description is provided mainly of difference from the first embodiment.

A sequence program includes a device that is used between an input device and an output device. In a description below, such a device is referred to as an "intermediate device". In a sequence program, a common intermediate device may be used in different sets of an input device and an output device. In conventional debugging support, a set of devices for which it cannot be determined whether or not the dependency relation exists from the sequence program and which are unrelated in the actual sequence control may be extracted as devices having a dependency relation. Therefore, in the conventional debugging support, debugging is performed on the devices that require no checking, which presents a problem in that time required for the debugging increases. The debug support apparatus 2 according to the second embodiment deletes such sets of devices that are unrelated in the actual sequence control from the extraction result regarding dependency relations.

The deletion target detection unit 40 detects, from collected log information, any set of variables that is to be deleted from an extraction result regarding the dependency relation extracted by the dependency relation extraction unit 16. The set of variables to be deleted is a set of variables that do not have a dependency relation but are erroneously determined as having the dependency relation. The dependency relation correction unit 20 corrects the extraction result regarding the dependency relations by deleting, from the extraction result regarding the dependency relation, the set of variables that is detected to be deleted. As in the first embodiment, the function of debug support apparatus 2 is implemented by the hardware configuration illustrated in FIG. 2. The deletion target detection unit 40 is implemented with a combination of the processor 10 and software. The deletion target detection unit 40 may be implemented with a combination of the processor 10 and firmware or with a combination of the processor 10, software, and firmware.

Figure 11:
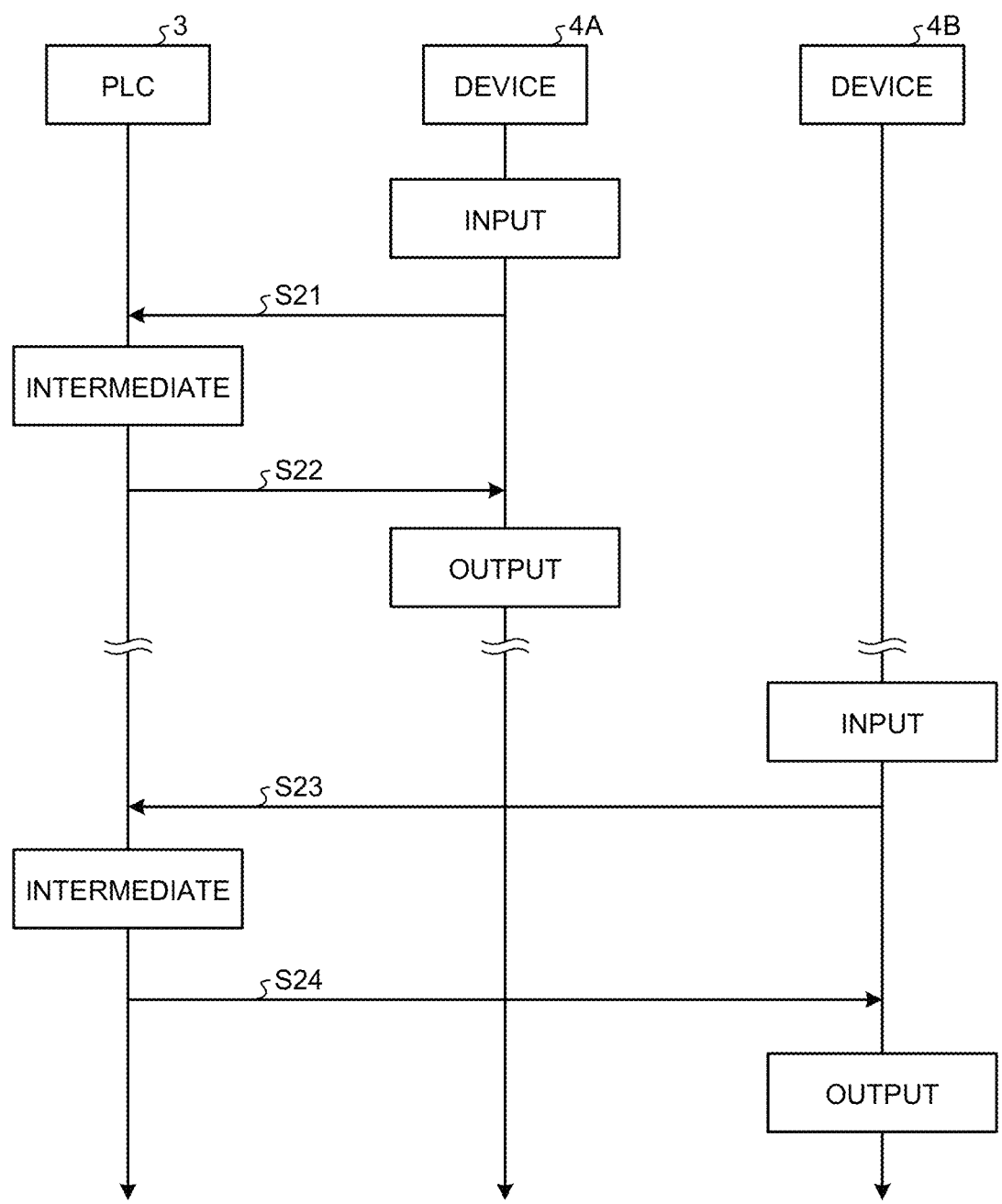
FIG. 11 is a first diagram illustrating a sequence program that undergoes debugging support by the debug support apparatus according to the second embodiment.
Figure 12:
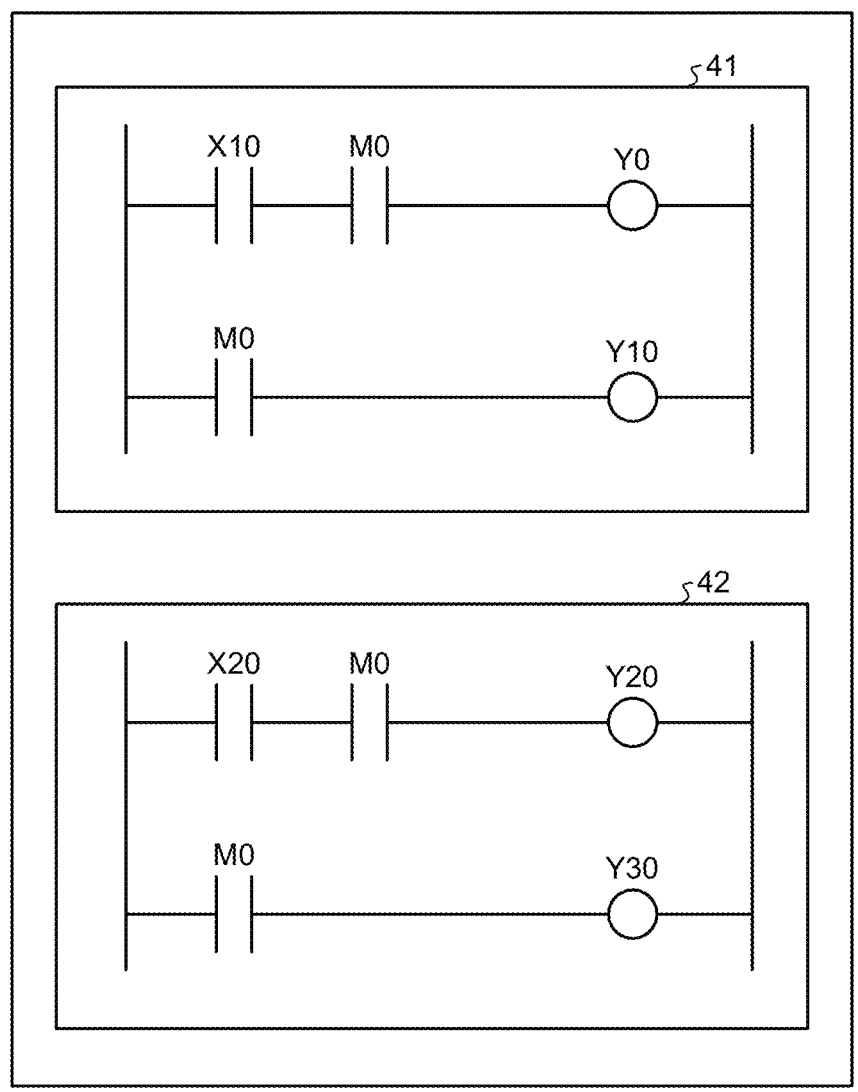
FIG. 12 is a second diagram illustrating the sequence program that undergoes the debugging support by the debug support apparatus according to the second embodiment.

FIG. 11 is a first diagram illustrating a sequence program that undergoes debugging support by the debug support apparatus according to the second embodiment. FIG. 12 is a second diagram illustrating the sequence program that undergoes the debugging support by the debug support apparatus according to the second embodiment. FIG. 11 is a sequence diagram illustrating an example of sequence control that includes a process block describing a process for the device 4A and a process block describing a process for the device 4B. FIG. 12 illustrates an example in which the sequence diagram in FIG. 11 is replaced with a ladder program.

At step S21, the device 4A transmits to the PLC 3 a signal that turns on the input relay for the terminal assigned for input to a constituent element of the device 4A. After going through intermediate processing based on a description in the process block A, the PLC 3 transmits a signal for output control to the device 4A at step S22. At step S23, the device 4B transmits to the PLC 3 a signal that turns on the input relay for the terminal assigned for input to a constituent element of the device 4B. After going through intermediate processing based on a description in the process block B, the PLC 3 transmits a signal for output control to the device 4B at step S24.

In FIG. 12, a circuit block 41 refers to a circuit block constituting the process block A. A circuit block 42 refers to a circuit block constituting the process block B. The circuit block 41 includes the device X10, which serves as the input device, a device M0 serving as an intermediate device, and the devices Y0 and Y10, which serve as the output devices. The circuit block 42 includes a device X20 serving as an input device, the device M0 that serves as the intermediate device, and devices Y20 and Y30 serving as output devices. The intermediate device is a variable or a data area that has been assigned for intermediate processing in the PLC 3.

In the circuit block 41, when a value is input to each of the devices X10 and M0, a value is input to the device Y0. Moreover, when a value is input to the device M0, a value is input to the device Y10. In the circuit block 42, when a value is input to each of the devices X20 and M0, a value is input to the device Y20. Moreover, when a value is input to the device M0, a value is input to the device Y30.

The circuit block 41 and the circuit block 42 use the common device M0. However, suppose that the processing using the device M0 in the process block A and the processing using the device M0 in the process block B are unrelated. In FIG. 12, for example, the device M0 and the device Y10 have a dependency relation in the process block A. In the process block B, the device M0 and the device Y30 have a dependency relation. The device M0 in the process block A and the device Y30 in the process block B have no dependency relation.

Figure 13:
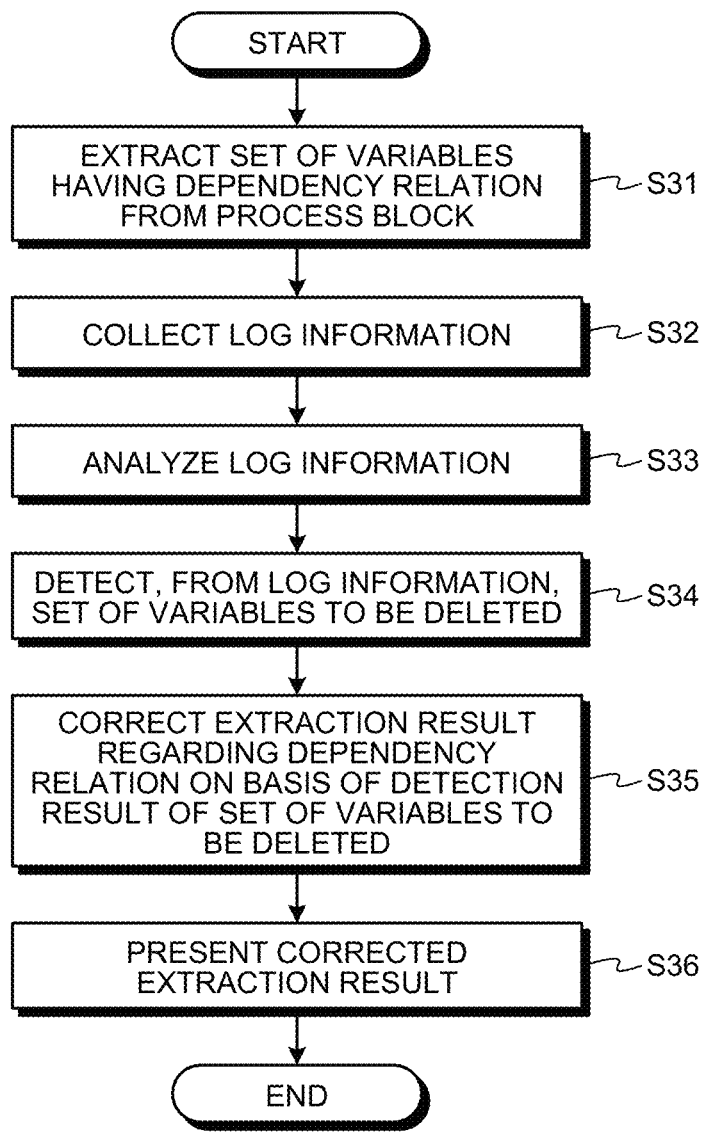
FIG. 13 is a flowchart illustrating an operational procedure of the debug support apparatus according to the second embodiment.

A description is provided next of how the debug support apparatus 2 operates. FIG. 13 is a flowchart illustrating an operational procedure of the debug support apparatus according to the second embodiment. At step S31, the dependency relation extraction unit 16 extracts any set of variables having a dependency relation from any process block. Step S31 is similar to step S11 of FIG. 5.

At step S32, the log information collection unit 17 collects log information. At step S33, the log information analysis unit 18 analyzes the log information collected at step S32. Step S32 is similar to step S12 of FIG. 5. Step S33 is similar to step S13 of FIG. 5.

FIG. 14 is a diagram illustrating examples of the log information that are detected by the log information analysis unit of the debug support apparatus according to the second embodiment. In FIG. 14, input device information includes log information on the intermediate device. FIG. 14 illustrates input device information on each of the devices X10, X20, and M0 and output devices information on each of the devices Y0, Y10, Y20, and Y30 in the log information detected.

At step S34, the deletion target detection unit 40 detects, from the log information, any set of variables to be deleted. A description is provided here of how the deletion target detection unit 40 detects a set of variables to be deleted.

The deletion target detection unit 40 calculates a time difference, that is to say, a difference between a date and time included in the input device information regarding the process block A and a date and time included in the output device information regarding the process block B. In FIG. 14, for example, there is a time difference of 1 hour, 0 minutes, and 59 seconds between the input device information d11 that includes the date and time "20xx/xx/xx 00:00:31" and the triggered device "M0" and the output device information d12 that includes the date and time "20xx/xx/xx 01:01:30" and the triggered device "Y30". The input device information d11 refers to the input device information regarding the process block A. The output device information d12 refers to the output device information regarding the process block B. The deletion target detection unit 40 calculates a time difference for every input device information regarding each of the process blocks A and B and a time difference for every output device information regarding each of the process blocks A and B.

The deletion target detection unit 40 calculates an average time difference for each set of the triggered device of the input device information and the triggered device of the output device information. If the calculated average for a certain set of devices is greater than a threshold, the deletion target detection unit 40 determines that the set of devices is to be deleted. For example, when the calculated average for the set of the device M0 in the process block A and the device Y30 in the process block B is greater than the threshold, the deletion target detection unit 40 determines that the device M0 in the process block A and the device Y30 in the process block B are the set to be deleted.

At step S35, the dependency relation correction unit 20 corrects an extraction result regarding the dependency relation on the basis of a detection result of the set of variables to be deleted. At step S36, the dependency relation presentation unit 21 presents a corrected extraction result.

Figure 15:
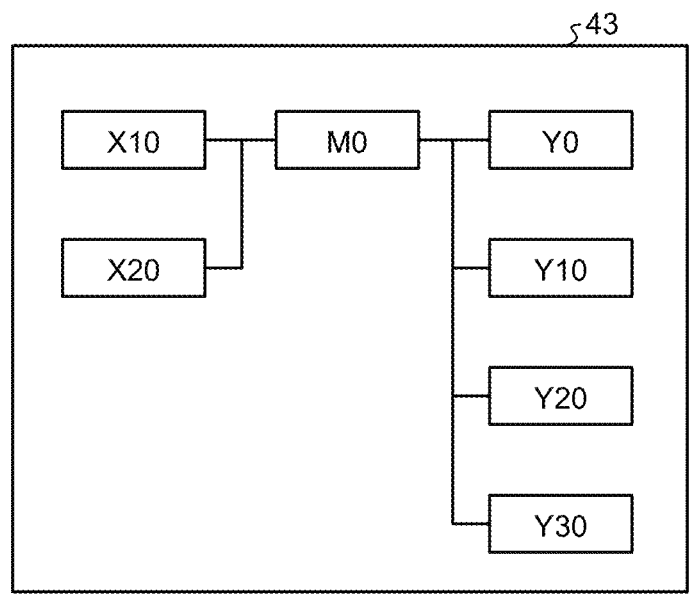
FIG. 15 is a diagram illustrating an example of an extraction result from a dependency relation extraction unit of the debug support apparatus according to the second embodiment.
Figure 16:
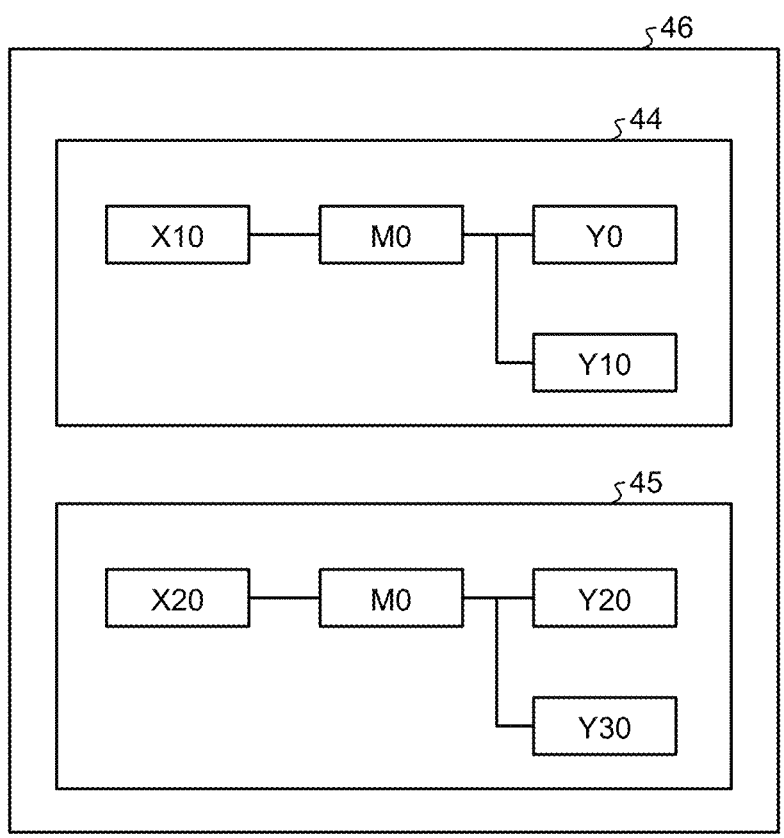
FIG. 16 is a diagram illustrating an example of a corrected extraction result from a dependency relation correction unit of the debug support apparatus according to the second embodiment.

A description is provided here of the correction that the dependency relation correction unit 20 performs on the extraction result regarding the dependency relation. FIG. 15 is a diagram illustrating an example of the extraction result from the dependency relation extraction unit of the debug support apparatus according to the second embodiment. FIG. 16 is a diagram illustrating an example of the corrected extraction result from the dependency relation correction unit of the debug support apparatus according to the second embodiment.

In the description, suppose that there is no dependency relation between the devices X10 and X20, which are the input devices. The extraction result 43 illustrated in FIG. 15 shows that there is a dependency relation between the device X10 and the device X20. The dependency relation correction unit 20 duplicates the extraction result 43, corrects the extraction result 43 to an extraction result 44 illustrated in FIG. 16, and corrects the extraction result 43 to an extraction result 45 illustrated in FIG. 16. In this way, the dependency relation correction unit 20 corrects the extraction result 43 to the extraction result 46 illustrated in FIG. 16. The extraction result 46 includes the extraction result 44 and the extraction result 45.

A description is provided here of how the extraction result 43 is corrected to the extraction result 44. FIG. 15 illustrates an example of the extraction result 43 of a dependency relation including the variables in the process blocks A and B. The extraction result 43 from the dependency relation extraction unit 16 includes the dependency relation between the device M0 in the process block A and the device Y30 in the process block B. Even though the device M0 in the process block A and the device Y30 in the process block B have no dependency relation, the extraction result 43 shows that these devices have the dependency relation. The extraction result 43 also shows that the device M0 in the process block A and the device Y20 in the process block B have the dependency relation even though these devices have no dependency relation.

Suppose that the deletion target detection unit 40 detects the set of the device M0 in the process block A and the device Y30 in the process block B and the set of the device M0 in the process block A and the device Y20 in the process block B as the sets to be deleted. The dependency relation correction unit 20 deletes, from the extraction result 43, the set of the device M0 in the process block A and the device Y30 in the process block B and the set of the device M0 in the process block A and the device Y20 in the process block B.

The extraction result 43 includes the dependency relation between the device X10 in the process block A and the device X20 in the process block B. When the time difference between the time of input of a value to the device X10 and the time of input of a value to the device X20 is greater than the threshold, the dependency relation correction unit 20 determines that the device X10 in the process block A and the device X20 in the process block B have no dependency relation. The dependency relation correction unit 20 deletes the device X20 in the process block B from the dependency relations of the device X10 in the process block A. In this way, the dependency relation correction unit 20 corrects the extraction result 43 to the extraction result 44.

A description is provided next of how the extraction result 43 is corrected to the extraction result 45. The extraction result 43 from the dependency relation extraction unit 16 includes the dependency relation between the device M0 in the process block B and the device Y0 in the process block A. Even though the device M0 in the process block B and the device Y0 in the process block A have no dependency relation, the extraction result 43 shows that these devices have the dependency relation. The extraction result 43 also shows that the device M0 in the process block B and the device Y10 in the process block A have the dependency relation even though these devices have no dependency relation.

Suppose that the deletion target detection unit 40 detects a set of the device M0 in the process block B and the device Y0 in the process block A and a set of the device M0 in the process block B and the device Y10 in the process block A as the sets to be deleted. The dependency relation correction unit 20 deletes, from the extraction result 43, the set of the device M0 in the process block B and the device Y0 in the process block A and the set of the device M0 in the process block B and the device Y10 in the process block A. On the basis of the above-described determination that the device X10 in the process block A and the device X20 in the process block B have no dependency relation, the dependency relation correction unit 20 deletes the device X10 in the process block A from the dependency relations of the device X20 in the process block B. In this way, the dependency relation correction unit 20 corrects the extraction result 43 to the extraction result 45.

The extraction results 44 and 45 illustrated in FIG. 16 represent the extraction result after the sets of devices detected to be deleted have been deleted. As described above, the dependency relation correction unit 20 corrects the extraction result 43 regarding the dependency relations by deleting the set of variables detected to be deleted from the extraction result 43 regarding the dependency relations. The dependency relation presentation unit 21 presents the corrected extraction result 46 as illustrated in FIG. 16.

The deletion target detection unit 40 may determine whether or not the set of variables is to be deleted on the basis of a standard deviation of the time differences as an alternative to the result of comparison between the average time difference and the threshold. In that case, the deletion target detection unit 40 calculates the standard deviation of the time differences instead of the average time difference. The deletion target detection unit 40 determines whether or not a set of variables is to be deleted from standard deviation-based variation of time differences. The deletion target detection unit 40 determines that a set of variables having a wider variation in time difference than other sets of variables is to be deleted.

The debug support apparatus 2 according to the second embodiment detects, from collected log information, any set of variables that is to be deleted from an extraction result regarding dependency relations. The debug support apparatus 2 corrects the extraction result regarding the dependency relations on the basis of a detection result of the set of variables to be deleted and presents a corrected extraction result. Therefore, a user can perform debugging without checking variables that actually have no dependency relation. Thus, the debug support apparatus 2 enables improved efficiency of debugging work.

The above configurations illustrated in the embodiments are illustrative of contents of the present disclosure. The configurations of the embodiments can be combined with other techniques that are publicly known. The configurations of the embodiments may be combined together as appropriate. The configurations of the embodiments can be partly omitted or changed without departing from the gist of the present disclosure.

REFERENCE SIGNS LIST 1, 2 debug support apparatus; 3 PLC; 4, 4A, 4B device; 10 processor; 11 memory; 12 input device; 13 display device; 14 storage device; 15 communication device; 16 dependency relation extraction unit; 17 log information collection unit; 18 log information analysis unit; 19 causal relation extraction unit; 20 dependency relation correction unit; 21 dependency relation presentation unit; 31, 32, 41, 42 circuit block; 33, 34, 35, 36, 43, 44, 45, 46 extraction result; 40 deletion target detection unit.

The invention claimed is:

1. A non-transitory debug support program storage medium storing a debug support program to cause a computer to function as a debug support apparatus that assists in debugging a sequence program to be executed by a control device, the debug support program causing the computer to execute:

generating an extraction result by extracting a set of variables having a dependency relation from a plurality of variables written in a plurality of process blocks included in the sequence program, each of the plurality of process blocks describing a process per slave device;

collecting log information recording information regarding input of a value to each of the plurality of variables written in the process blocks;

detecting, from the log information collected, a second set of variables that does not have the dependency relation and is to be deleted from the extraction result by calculating a time difference of the process blocks based on the input regarding the dependency relation;

correcting the extraction result regarding the dependency relation on the basis of contents of the log information collected by deleting, from the extraction result, the second set of variables to be deleted; and presenting the corrected extraction result, wherein the dependency relation is a relation in which a value of one of at least two variables determines a value of another of the at least two variables.

2. The debug support program storage medium according to claim 1, wherein a first process block is a process block that describes a process for a first slave device that is one of a plurality of slave devices, and a second process block is a process block that describes a process for a second slave device that is another of the plurality of slave devices, the program causes the computer to execute extracting, from the log information collected, a set of variables having a causal relation, the causal relation being a relation in which output control resulting from input of a value to a variable assigned for output of the first slave device in the first process block causes a value to be input to a variable assigned for input to the second slave device in the second process block, and the correcting the extraction result regarding the dependency relation includes adding an extraction result regarding the causal relation to the extraction result regarding the dependency relation.

3. The debug support program storage medium according to claim 2, wherein time difference is calculated between a date and time at which a value is input to a variable written in the first process block and a date and time at which a value is input to a variable written in the second process block, and whether or not the causal relation exists is determined on the basis of the time difference.

4. The debug support program storage medium according to claim 3, wherein whether or not the causal relation exists is determined on the basis of a result of comparison between an average of time differences calculated and a threshold.

5. The debug support program storage medium according to claim 3, wherein whether or not the causal relation exists is determined on the basis of a standard deviation of time differences calculated.

6. The debug support program storage medium according to claim 1, wherein
a first process block is a process block that describes a process for a first slave device that is one of a plurality of slave devices, and a second process block is a process block that describes a process for a second slave device that is another of the plurality of slave devices, and
the time difference is calculated between a first date and time at which a value is input to a variable written in the first process block and a second date and time at which a value is input to a variable written in the second process block, and whether or not the second set of variables is to be deleted is determined on the basis of the time difference.

7. The debug support program storage medium according to claim 6, wherein whether or not the second set of variables is to be deleted is determined on the basis of a result of comparison between an average of time differences calculated and a threshold.

8. The debug support program storage medium according to claim 6, wherein whether or not the second set of variables is to be deleted is determined on the basis of a standard deviation of time differences calculated.

9. A debug support apparatus to assist in debugging a sequence program to be executed by a control device, the debug support apparatus comprising:
dependency relation extraction circuitry to generate an extraction result by extracting a set of variables having a dependency relation from a plurality of variables written in a plurality of process blocks included in the sequence program, each of the plurality of process blocks describing a process per slave device;
log information collection circuitry to collect log information recording information regarding input of a value to each of the plurality of variables written in the process blocks;
detection circuitry to detect, from the log information collected, a second set of variables that does not have the dependency relation and is to be deleted from the extraction result by calculating a time difference of the process blocks based on the input regarding the dependency relation;
correction circuitry to correct the extraction result regarding the dependency relation on the basis of contents of the log information collected by deleting, from the extraction result, the second set of variables to be deleted; and
presentation circuitry to present the corrected extraction result, wherein the dependency relation is a relation in which a value of one of at least two variables determines a value of another of the at least two variables.

10. A debug support method for assisting, by a debug support apparatus, in debugging a sequence program to be executed by a control device, the debug support method comprising:
generating an extraction result by extracting a set of variables having a dependency relation from a plurality of variables written in a plurality of process blocks included in the sequence program, each of the plurality of process blocks describing a process per slave device;
collecting log information recording information regarding input of a value to each of the plurality of variables written in the process blocks;
detecting, from the log information collected, a second set of variables that does not have the dependency relation and is to be deleted from the extraction result by calculating a time difference of the process blocks based on the input regarding the dependency relation;
correcting the extraction result regarding the dependency relation on the basis of contents of the log information collected by deleting, from the extraction result, the second set of variables to be deleted; and
presenting the corrected extraction result, wherein
the dependency relation is a relation in which a value of one of at least two variables determines a value of another of the at least two variables.

* * * * *